(12) United States Patent
Das et al.

(10) Patent No.: US 11,150,733 B2
(45) Date of Patent: Oct. 19, 2021

(54) METHODS AND APPARATUSES FOR PROVIDING A HAPTIC OUTPUT SIGNAL TO A HAPTIC ACTUATOR

(71) Applicant: Cirrus Logic International Semiconductor Ltd., Edinburgh (GB)

(72) Inventors: Tejasvi Das, Austin, TX (US); Michael A. Kost, Austin, TX (US); Matthew Beardsworth, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 13 days.

(21) Appl. No.: 16/661,323

(22) Filed: Oct. 23, 2019

(65) Prior Publication Data

US 2020/0387225 A1 Dec. 10, 2020

Related U.S. Application Data

(60) Provisional application No. 62/858,445, filed on Jun. 7, 2019.

(51) Int. Cl.
*G08B 6/00* (2006.01)
*G06F 3/01* (2006.01)

(52) U.S. Cl.
CPC .............. *G06F 3/016* (2013.01); *G08B 6/00* (2013.01)

(58) Field of Classification Search
CPC .............. G06F 3/016; G06F 2203/014; G06F 2203/04105; G06F 3/0488; G06F 3/04166; G06F 3/044; G06F 3/04812; G06F 3/04847; G06F 3/0486; G06F 2203/04808;

(Continued)

(56) References Cited

U.S. PATENT DOCUMENTS

| 3,686,927 A | 8/1972 | Scharton |
| 4,902,136 A | 2/1990 | Mueller et al. |
| 5,684,722 A | 11/1997 | Thorner et al. |

(Continued)

FOREIGN PATENT DOCUMENTS

| AU | 2002347829 | 4/2003 |
| CN | 103165328 A | 6/2013 |

(Continued)

OTHER PUBLICATIONS

International Search Report and Written Opinion of the International Searching Authority, International Application No. PCT/GB2019/052991, dated Mar. 17, 2020, received by Applicant Mar. 19, 2020.

(Continued)

*Primary Examiner* — Anh V La
(74) *Attorney, Agent, or Firm* — Jackson Walker L.L.P.

(57) ABSTRACT

Embodiments described herein relate to methods and apparatuses for providing a haptic output signal to a haptic actuator. A controller comprises an input configured to receive a force sensor signal from at least one force sensor; and a haptic output module configured to generate a haptic output signal for output to a haptic actuator; wherein the haptic output module is configured to: responsive to determining that the force sensor signal indicates that a force level applied to the at least one force sensor exceeds a first threshold, trigger output of the haptic output signal; and during output of the haptic output signal, adjust the haptic output signal based on the force sensor signal.

22 Claims, 4 Drawing Sheets

(58) Field of Classification Search
CPC ......... G06F 2203/04106; G06F 3/0414; G06F 3/0416; G08B 6/00
USPC ............. 340/407.2, 407.1, 693.5, 691.1, 540
See application file for complete search history.

(56) References Cited

U.S. PATENT DOCUMENTS

| | | | |
|---|---|---|---|
| 5,748,578 | A | 5/1998 | Schell |
| 5,857,986 | A | 1/1999 | Moriyasu |
| 6,050,393 | A | 4/2000 | Murai et al. |
| 6,278,790 | B1 | 8/2001 | Davis et al. |
| 6,332,029 | B1 | 12/2001 | Azima et al. |
| 6,388,520 | B2 | 5/2002 | Wada et al. |
| 6,580,796 | B1 | 6/2003 | Kuroki |
| 6,683,437 | B2 | 1/2004 | Tierling |
| 6,703,550 | B2 | 3/2004 | Chu |
| 6,762,745 | B1 | 7/2004 | Braun et al. |
| 6,906,697 | B2 | 6/2005 | Rosenberg |
| 6,995,747 | B2 | 2/2006 | Casebolt et al. |
| 7,154,470 | B2 | 12/2006 | Tierling |
| 7,623,114 | B2 | 11/2009 | Rank |
| 7,639,232 | B2 | 12/2009 | Grant et al. |
| 7,791,588 | B2 | 9/2010 | Tierling et al. |
| 7,979,146 | B2 | 7/2011 | Ulrich et al. |
| 8,068,025 | B2 | 11/2011 | Devenyi et al. |
| 8,098,234 | B2 | 1/2012 | Lacroix et al. |
| 8,102,364 | B2 | 1/2012 | Tierling |
| 8,325,144 | B1 | 12/2012 | Tierling et al. |
| 8,427,286 | B2 | 4/2013 | Grant et al. |
| 8,441,444 | B2 | 5/2013 | Moore et al. |
| 8,466,778 | B2 | 6/2013 | Hwang et al. |
| 8,480,240 | B2 | 7/2013 | Kashiyama |
| 8,572,293 | B2 | 10/2013 | Cruz-Hernandez et al. |
| 8,572,296 | B2 | 10/2013 | Shasha et al. |
| 8,593,269 | B2 | 11/2013 | Grant et al. |
| 8,648,829 | B2 | 2/2014 | Shahoian et al. |
| 8,659,208 | B1 | 2/2014 | Rose et al. |
| 8,754,757 | B1 | 6/2014 | Ullrich et al. |
| 8,947,216 | B2 | 2/2015 | Da Costa et al. |
| 8,981,915 | B2 | 3/2015 | Birnbaum et al. |
| 8,994,518 | B2 | 3/2015 | Gregorio et al. |
| 9,030,428 | B2 | 5/2015 | Fleming |
| 9,063,570 | B2 | 6/2015 | Weddle et al. |
| 9,083,821 | B2 | 7/2015 | Hughes |
| 9,092,059 | B2 | 7/2015 | Bhatia |
| 9,117,347 | B2 | 8/2015 | Matthews |
| 9,128,523 | B2 | 9/2015 | Buuck et al. |
| 9,164,587 | B2 | 10/2015 | Da Costa et al. |
| 9,196,135 | B2 | 11/2015 | Shah et al. |
| 9,248,840 | B2 | 2/2016 | Truong |
| 9,326,066 | B2 | 4/2016 | Klippel |
| 9,329,721 | B1 | 5/2016 | Buuck et al. |
| 9,354,704 | B2 | 5/2016 | Lacroix et al. |
| 9,368,005 | B2 | 6/2016 | Cruz-Hernandez et al. |
| 9,489,047 | B2 | 11/2016 | Jiang et al. |
| 9,507,423 | B2 | 11/2016 | Gandhi et al. |
| 9,513,709 | B2 | 12/2016 | Gregorio et al. |
| 9,520,036 | B1 | 12/2016 | Buuck |
| 9,588,586 | B2 | 3/2017 | Rihn |
| 9,640,047 | B2 | 5/2017 | Choi et al. |
| 9,652,041 | B2 | 5/2017 | Jiang et al. |
| 9,697,450 | B1 | 7/2017 | Lee |
| 9,715,300 | B2 * | 7/2017 | Sinclair ............... G06F 3/04815 |
| 9,740,381 | B1 | 8/2017 | Chaudhri et al. |
| 9,842,476 | B2 | 12/2017 | Rihn et al. |
| 9,864,567 | B2 | 1/2018 | Seo |
| 9,881,467 | B2 | 1/2018 | Levesque |
| 9,886,829 | B2 * | 2/2018 | Levesque ................ G06F 3/016 |
| 9,946,348 | B2 | 4/2018 | Saboune et al. |
| 9,947,186 | B2 | 4/2018 | Macours |
| 9,959,744 | B2 | 5/2018 | Koskan et al. |
| 9,965,092 | B2 | 5/2018 | Smith |
| 10,032,550 | B1 | 7/2018 | Zhang et al. |
| 10,055,950 | B2 | 8/2018 | Saboune et al. |
| 10,074,246 | B2 | 9/2018 | Da Costa et al. |
| 10,110,152 | B1 | 10/2018 | Hajati |
| 10,171,008 | B2 | 1/2019 | Nishitani et al. |
| 10,175,763 | B2 | 1/2019 | Shah |
| 10,264,348 | B1 | 4/2019 | Harris et al. |
| 10,275,087 | B1 * | 4/2019 | Smith ..................... G06F 3/044 |
| 10,447,217 | B2 | 10/2019 | Zhao et al. |
| 10,564,727 | B2 | 2/2020 | Billington et al. |
| 10,620,704 | B2 | 4/2020 | Rand et al. |
| 10,732,714 | B2 | 8/2020 | Rao et al. |
| 10,782,785 | B2 | 9/2020 | Hu et al. |
| 10,795,443 | B2 | 10/2020 | Hu et al. |
| 10,820,100 | B2 | 10/2020 | Stahl et al. |
| 10,828,672 | B2 | 11/2020 | Stahl et al. |
| 10,848,886 | B2 | 11/2020 | Rand |
| 10,860,202 | B2 | 12/2020 | Sepehr et al. |
| 10,969,871 | B2 | 4/2021 | Rand et al. |
| 2001/0043714 | A1 | 11/2001 | Asada et al. |
| 2002/0018578 | A1 | 2/2002 | Burton |
| 2003/0068053 | A1 | 4/2003 | Chu |
| 2003/0214485 | A1 | 11/2003 | Roberts |
| 2005/0031140 | A1 | 2/2005 | Browning |
| 2005/0134562 | A1 | 6/2005 | Grant et al. |
| 2006/0028095 | A1 | 2/2006 | Maruyama et al. |
| 2006/0197753 | A1 | 9/2006 | Hotelling |
| 2006/0284856 | A1 | 12/2006 | Soss |
| 2008/0077367 | A1 | 3/2008 | Odajima |
| 2008/0226109 | A1 | 9/2008 | Yamakata et al. |
| 2008/0240458 | A1 | 10/2008 | Goldstein |
| 2008/0293453 | A1 | 11/2008 | Atlas et al. |
| 2008/0316181 | A1 | 12/2008 | Nurmi |
| 2009/0020343 | A1 | 1/2009 | Rothkopf et al. |
| 2009/0079690 | A1 | 3/2009 | Watson et al. |
| 2009/0088220 | A1 | 4/2009 | Persson |
| 2009/0096632 | A1 | 4/2009 | Ullrich et al. |
| 2009/0102805 | A1 | 4/2009 | Meijer et al. |
| 2009/0153499 | A1 | 6/2009 | Kim et al. |
| 2009/0278819 | A1 | 11/2009 | Goldenberg et al. |
| 2010/0013761 | A1 | 1/2010 | Birnbaum et al. |
| 2010/0141408 | A1 | 6/2010 | Doy et al. |
| 2011/0056763 | A1 | 3/2011 | Tanase et al. |
| 2011/0141052 | A1 | 6/2011 | Bernstein et al. |
| 2011/0161537 | A1 | 6/2011 | Chang |
| 2011/0163985 | A1 | 7/2011 | Bae et al. |
| 2011/0167391 | A1 | 7/2011 | Momeyer et al. |
| 2012/0011436 | A1 | 1/2012 | Jinkinson et al. |
| 2012/0105358 | A1 | 5/2012 | Momeyer et al. |
| 2012/0112894 | A1 * | 5/2012 | Yang ..................... G06F 3/016 340/407.1 |
| 2012/0206246 | A1 | 8/2012 | Cruz-Hernandez et al. |
| 2012/0206247 | A1 | 8/2012 | Bhatia et al. |
| 2012/0229264 | A1 | 9/2012 | Company Bosch et al. |
| 2012/0253698 | A1 | 10/2012 | Cokonaj |
| 2012/0306631 | A1 | 12/2012 | Hughes et al. |
| 2013/0027359 | A1 | 1/2013 | Schevin et al. |
| 2013/0038792 | A1 | 2/2013 | Quigley et al. |
| 2013/0141382 | A1 | 6/2013 | Simmons et al. |
| 2013/0275058 | A1 | 10/2013 | Awad |
| 2013/0289994 | A1 | 10/2013 | Newman et al. |
| 2014/0056461 | A1 | 2/2014 | Afshar |
| 2014/0064516 | A1 | 3/2014 | Cruz-Hernandez et al. |
| 2014/0079248 | A1 | 3/2014 | Short et al. |
| 2014/0118125 | A1 | 5/2014 | Bhatia |
| 2014/0118126 | A1 | 5/2014 | Garg et al. |
| 2014/0119244 | A1 | 5/2014 | Steer et al. |
| 2014/0139327 | A1 | 5/2014 | Bau et al. |
| 2014/0226068 | A1 | 8/2014 | Lacroix et al. |
| 2014/0292501 | A1 | 10/2014 | Lim et al. |
| 2014/0340209 | A1 | 11/2014 | Lacroix et al. |
| 2014/0347176 | A1 | 11/2014 | Modarres et al. |
| 2015/0061846 | A1 | 3/2015 | Yliaho |
| 2015/0070260 | A1 | 3/2015 | Saboune et al. |
| 2015/0084752 | A1 | 3/2015 | Heubel et al. |
| 2015/0130767 | A1 | 5/2015 | Myers et al. |
| 2015/0208189 | A1 | 7/2015 | Tsai |
| 2015/0216762 | A1 | 8/2015 | Oohashi et al. |
| 2015/0324116 | A1 | 11/2015 | Marsden et al. |
| 2015/0325116 | A1 | 11/2015 | Umminger, III |
| 2015/0341714 | A1 | 11/2015 | Ahn et al. |
| 2016/0063826 | A1 | 3/2016 | Morrell et al. |

(56) References Cited

U.S. PATENT DOCUMENTS

| | | |
|---|---|---|
| 2016/0070392 A1 | 3/2016 | Wang et al. |
| 2016/0074278 A1 | 3/2016 | Muench et al. |
| 2016/0132118 A1 | 5/2016 | Park et al. |
| 2016/0141606 A1 | 5/2016 | Ahn et al. |
| 2016/0162031 A1 | 6/2016 | Westerman et al. |
| 2016/0179203 A1 | 6/2016 | Modarres et al. |
| 2016/0239089 A1 | 8/2016 | Taninaka et al. |
| 2016/0246378 A1 | 8/2016 | Sampanes et al. |
| 2016/0358605 A1 | 12/2016 | Ganong, III et al. |
| 2017/0078804 A1 | 3/2017 | Guo et al. |
| 2017/0083096 A1 | 3/2017 | Rihn et al. |
| 2017/0090572 A1 | 3/2017 | Holenarsipur et al. |
| 2017/0090573 A1 | 3/2017 | Hajati et al. |
| 2017/0153760 A1 | 6/2017 | Chawda et al. |
| 2017/0168574 A1 | 6/2017 | Zhang |
| 2017/0220197 A1 | 8/2017 | Matsumoto et al. |
| 2017/0277350 A1 | 9/2017 | Wang et al. |
| 2017/0357440 A1 | 12/2017 | Tse |
| 2018/0059733 A1 | 3/2018 | Gault et al. |
| 2018/0059793 A1 | 3/2018 | Hajati |
| 2018/0067557 A1 | 3/2018 | Robert et al. |
| 2018/0074637 A1 | 3/2018 | Rosenberg et al. |
| 2018/0082673 A1 | 3/2018 | Tzanetos |
| 2018/0084362 A1 | 3/2018 | Zhang et al. |
| 2018/0151036 A1 | 5/2018 | Cha et al. |
| 2018/0158289 A1 | 6/2018 | Vasilev et al. |
| 2018/0159457 A1 | 6/2018 | Eke |
| 2018/0160227 A1 | 6/2018 | Lawrence et al. |
| 2018/0178114 A1 | 6/2018 | Mizuta et al. |
| 2018/0182212 A1 | 6/2018 | Li et al. |
| 2018/0183372 A1 | 6/2018 | Li et al. |
| 2018/0196567 A1 | 7/2018 | Klein et al. |
| 2018/0237033 A1 | 8/2018 | Hakeem et al. |
| 2018/0253123 A1 | 9/2018 | Levesque et al. |
| 2018/0267897 A1 | 9/2018 | Jeong |
| 2018/0321748 A1 | 11/2018 | Rao et al. |
| 2018/0329172 A1 | 11/2018 | Tabuchi |
| 2018/0335848 A1 | 11/2018 | Moussette et al. |
| 2018/0367897 A1 | 12/2018 | Bjork et al. |
| 2019/0227628 A1 | 1/2019 | Rand et al. |
| 2019/0064925 A1 | 2/2019 | Kim et al. |
| 2019/0073078 A1 | 3/2019 | Sheng et al. |
| 2019/0103829 A1 | 4/2019 | Vasudevan et al. |
| 2019/0138098 A1 | 5/2019 | Shah |
| 2019/0163234 A1 | 5/2019 | Kim et al. |
| 2019/0215349 A1 | 7/2019 | Adams et al. |
| 2019/0114496 A1 | 8/2019 | Lesso |
| 2019/0235629 A1 | 8/2019 | Hu et al. |
| 2019/0294247 A1 | 9/2019 | Hu et al. |
| 2019/0296674 A1 | 9/2019 | Janko et al. |
| 2019/0297418 A1 | 9/2019 | Stahl |
| 2019/0311590 A1 | 10/2019 | Doy et al. |
| 2019/0341903 A1 | 11/2019 | Kim |
| 2020/0117506 A1 | 4/2020 | Chan |
| 2020/0218352 A1 | 7/2020 | Macours et al. |
| 2020/0401292 A1 | 12/2020 | Lorenz et al. |
| 2021/0108975 A1 | 4/2021 | Peso Parada et al. |

FOREIGN PATENT DOCUMENTS

| | | |
|---|---|---|
| CN | 103403796 A | 11/2013 |
| CN | 204903757 U | 12/2015 |
| CN | 105264551 A | 1/2016 |
| CN | 106438890 A | 2/2017 |
| CN | 106950832 A | 7/2017 |
| CN | 107665051 A | 2/2018 |
| EP | 0784844 B1 | 6/2005 |
| EP | 2363785 A1 | 9/2011 |
| EP | 2487780 A1 | 8/2012 |
| EP | 2600225 A1 | 6/2013 |
| EP | 2846329 A1 | 3/2015 |
| EP | 2988528 A1 | 2/2016 |
| EP | 3125508 A1 | 2/2017 |
| EP | 3379382 A1 | 9/2018 |
| GB | 201620746 A | 1/2017 |
| IN | 201747044027 | 8/2018 |
| JP | H02130433 B2 | 5/1990 |
| JP | 08149006 A | 6/1996 |
| JP | 6026751 B2 | 11/2016 |
| JP | 6250985 | 12/2017 |
| JP | 6321351 | 5/2018 |
| WO | 2013104919 A1 | 7/2013 |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2017113651 A1 | 7/2017 |
| WO | 2018053159 A1 | 3/2018 |
| WO | 2018067613 A1 | 4/2018 |
| WO | 2018125347 A1 | 7/2018 |
| WO | 2020004840 A1 | 1/2020 |
| WO | 2020055405 A1 | 3/2020 |

OTHER PUBLICATIONS

International Search Report and Written Opinion of the International Searching Authority, International Application No. PCT/US2020/023342, dated Jun. 9, 2020.

International Search Report and Written Opinion of the International Searching Authority, International Application No. PCT/GB2020/050823, dated Jun. 30, 2020.

Communication Relating to the Results of the Partial International Search, and Provisional Opinion Accompanying the Partial Search Result, of the International Searching Authority, International Application No. PCT/GB2020/050822, dated Jul. 9, 2020.

International Search Report and Written Opinion of the International Searching Authority, International Application No. PCT/GB2020/051037, dated Jul. 9, 2020.

International Search Report and Written Opinion of the International Searching Authority, International Application No. PCT/GB2020/051035, dated Jul. 10, 2020.

International Search Report and Written Opinion of the International Searching Authority, International Application No. PCT/US2020/024864, dated Jul. 6, 2020.

International Search Report and Written Opinion of the International Searching Authority, International Application No. PCT/GB2019/050770, dated Jul. 5, 2019.

Combined Search and Examination Report, UKIPO, Application No. GB1720424.9, dated Jun. 5, 2018.

Communication Relating to the Results of the Partial International Search, and Provisional Opinion Accompanying the Partial Search Result, of the International Searching Authority, International Application No. PCT/US2018/031329, dated Jul. 20, 2018.

International Search Report and Written Opinion of the International Searching Authority, International Application No. PCT/GB2019/050964, dated Sep. 3, 2019.

International Search Report and Written Opinion of the International Searching Authority, International Application No. PCT/GB2020/050822, dated Aug. 31, 2020.

International Search Report and Written Opinion of the International Searching Authority, International Application No. PCT/GB2020/051438, dated Sep. 28, 2020.

First Examination Opinion Notice, State Intellectual Property Office of the People's Republic of China, Application No. 201880037435.X, dated Dec. 31, 2020.

International Search Report and Written Opinion of the International Searching Authority, International Application No. PCT/US2020/056610, dated Jan. 21, 2021.

International Search Report and Written Opinion of the International Searching Authority, International Application No. PCT/GB2020/052537, dated Mar. 9, 2021.

Office Action of the Intellectual Property Office, ROC (Taiwan) Patent Application No. 107115475, dated Apr. 30, 2021.

First Office Action, China National Intellectual Property Administration, Patent Application No. 2019800208570, dated Jun. 3, 2021.

International Search Report and Written Opinion of the International Searching Authority, International Application No. PCT/US2021/021908, dated Jun. 9, 2021.

(56) References Cited

OTHER PUBLICATIONS

Notice of Preliminary Rejection, Korean Intellectual Property Office, Application No. 10-2019-7036236, dated Jun. 29, 2021.
Combined Search and Examination Report, United Kingdom Intellectual Property Office, Application No. 3B2018051.9, dated Jun. 30, 2021.
Communication pursuant to Rule 164(2)(b) and Article 94(3) EPC, European Patent Office, Application No. 18727512.8, dated Jul. 8, 2021.
Gottfried Behler: "Measuring the Loudspeaker's Impedance during Operation for the Derivation of the Voice Coil Temperature", AES Convention Preprint, Feb. 25, 1995 (Feb. 25, 1995), Paris.
First Office Action, China National Intellectual Property Administration, Patent Application No. 2019800211287, dated Jul. 5, 2021.

* cited by examiner

METHODS AND APPARATUSES FOR PROVIDING A HAPTIC OUTPUT SIGNAL TO A HAPTIC ACTUATOR

RELATED APPLICATIONS

The present disclosure relates to U.S. patent application Ser. No. 15/722,128 filed Oct. 2, 2017; U.S. patent application Ser. No. 16/267,079 filed Feb. 4, 2019; and U.S. patent application Ser. No. 16/422,543 filed May 24, 2019, all of which are incorporated by reference herein in their entireties.

TECHNICAL FIELD

Embodiments described herein relate to methods and apparatuses for the control of haptic output signals based on a changing input signal received from a force sensor system.

BACKGROUND

Linear resonant actuators (LRAs) and other vibrational actuators (e.g., rotational actuators, vibrating motors, etc.) are increasingly being used in mobile devices (e.g., mobile phones, personal digital assistants, video game controllers, etc.) or other systems to generate vibrational feedback for user interaction with such devices. Typically, a force/pressure sensor detects user interaction with the device (e.g., a finger press on a virtual button of the device) and in response thereto, the linear resonant actuator vibrates to provide feedback to the user. For example, a linear resonant actuator may vibrate in response to force to mimic to the user the feel of a mechanical button click.

One disadvantage of existing haptic systems is that existing approaches to processing of signals of a force sensor and generating of a haptic response thereto often have longer than desired latency, such that the haptic response may be significantly delayed from the user's interaction with the force sensor. Thus, in applications in which a haptic system is used for mechanical button replacement, capacitive sensor feedback, or other application, and the haptic response may not effectively mimic the feel of a mechanical button click. Accordingly, systems and methods that minimize latency between a user's interaction with a force sensor and a haptic response to the interaction are desired.

In addition, to create appropriate and pleasant haptic feelings for a user, a signal driving a linear resonant actuator may need to be carefully designed and generated. In mechanical button replacement application, a desirable haptic response may be one in which the vibrational impulse generated by the linear resonant actuator should be strong enough to give a user prominent notification as a response to his/her finger pressing and/or releasing, and the vibrational impulse should be short, fast, and clean from resonance tails to provide a user a "sharp" and "crisp" feeling. Optionally, different control algorithms and stimulus may be applied to a linear resonant actuator, to alter the performance to provide alternate tactile feedback—possibly denoting certain user modes in the device—giving more "soft" and "resonant" tactile responses.

SUMMARY

According to some embodiments there is provided a controller for providing a haptic output signal to a haptic actuator. The controller comprises an input configured to receive a force sensor signal from at least one force sensor; and a haptic output module configured to generate a haptic output signal for output to a haptic actuator; wherein the haptic output module is configured to: responsive to determining that the force sensor signal indicates that a force level applied to the at least one force sensor exceeds a first threshold, trigger output of the haptic output signal; and during output of the haptic output signal, adjust the haptic output signal based on the force sensor signal.

According to some embodiments there is provided a method for providing a haptic output signal to a haptic actuator. The method comprises receiving a force sensor signal from at least one force sensor, responsive to determining that the force sensor signal indicates that a force level applied to the at least one force sensor exceeds a first threshold, triggering output of a haptic output signal; and during output of the haptic output signal, adjusting the haptic output signal based on the force sensor signal.

According to some embodiments there is provided an integrated circuit. The integrated circuit comprises a controller for providing a haptic output signal to a haptic transducer, the controller comprising: an input configured to receive a force sensor signal from at least one force sensor, a haptic output module configured to generate a haptic output signal for output to a haptic actuator; wherein the haptic output module is configured to: responsive to determining that the force sensor signal indicates that a force level applied to the at least one force sensor exceeds a first threshold, trigger output of the haptic output signal; and during output of the haptic output signal, adjust the haptic output signal based on the force sensor signal.

According to some embodiments there is provided a device. The device comprises at least one force sensor, a haptic transducer; and a controller for providing a haptic output signal to a haptic transducer the controller comprising: an input configured to receive a force sensor signal from the at least one force sensor, a haptic output module configured to generate a haptic output signal for output to the haptic transducer; wherein the haptic output module is configured to: responsive to determining that the force sensor signal indicates that a force level applied to the at least one force sensor exceeds a first threshold, trigger output of the haptic output signal; and during output of the haptic output signal, adjust the haptic output signal based on the force sensor signal.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems, for example a mobile telephone, an audio player, a video player, a mobile computing platform, a games device, a remote controller device, a toy, a machine, or a home automation controller or a domestic appliance. However, for ease of explanation of one embodiment, an illustrative example will be described in FIG. 1, in which the implementation occurs in a mobile device 102.

Figure 1:
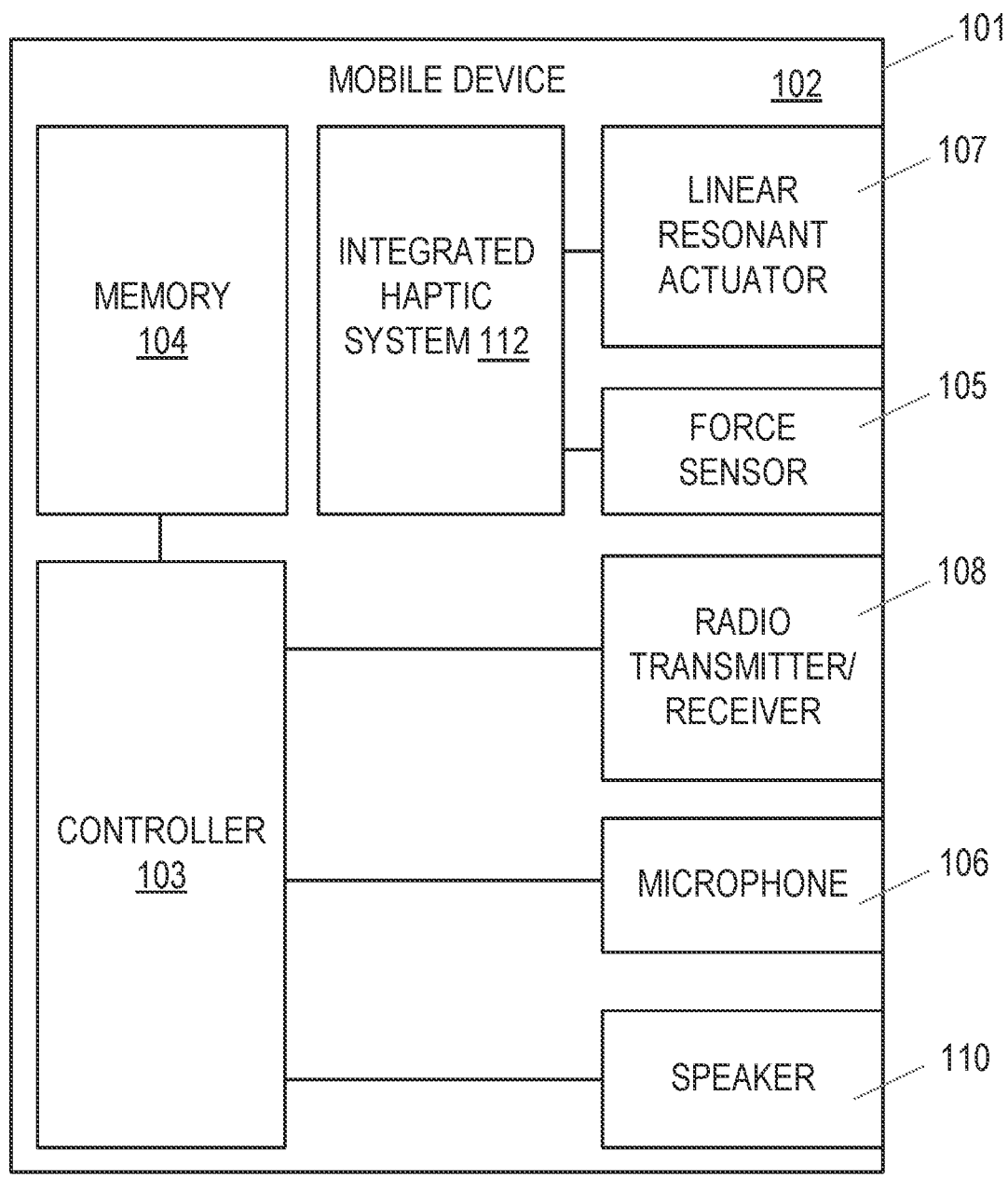
FIG. 1 illustrates block diagram of selected components of an example mobile device, in accordance with embodiments of the present disclosure.

FIG. 1 illustrates block diagram of selected components of an example mobile device 102, in accordance with embodiments of the present disclosure. As shown in FIG. 1, the mobile device 102 may comprise an enclosure 101, a controller 103, a memory 104, a force sensor system 105, a microphone 106, a haptic actuator 107 (which in this example comprises a linear resonant actuator (LRA)), a radio transmitter/receiver 108, a speaker 110, and an integrated haptic system 112. It will be understood that any suitable vibrational actuators arranged to provide a haptic vibration effect (e.g., rotational actuators such as ERMs, vibrating motors, etc.) may be used as an alternative to or in addition to the LRA 107.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102. While FIG. 1 illustrates a mobile device, it will be understood that the illustrated systems may be utilized in other device types, e.g. user-interactable display technology, automotive computing systems, etc.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 interprets and/or executes program instructions and/or processes data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies as based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, 5G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

The force sensor system 105 may be housed within, be located on or form part of the enclosure 101 and may be communicatively coupled to the controller 103. In this example, the force sensor system 105 comprises one or more force sensors, and each force sensor of the force sensor system 105 may include any suitable system, device, or apparatus for sensing a force, a pressure, or a touch (e.g., an interaction with a human finger) and for generating an electrical or electronic signal in response to such force, pressure, or touch. In some embodiments, such electrical or electronic signal may be a function of a magnitude of the force, pressure, or touch applied to the force sensor. In these and other embodiments, such electronic or electrical signal may comprise a general-purpose input/output signal (GPIO) associated with an input signal to which haptic feedback is given.

Example force sensors may include or comprise:
capacitive displacement sensors,
inductive force sensors,
strain gauges, piezoelectric force sensors,
force sensing resistors,
piezoresistive force sensors,
thin film force sensors, and
quantum tunneling composite-based force sensors.

In some arrangements, other types of sensor may be employed. For purposes of clarity and exposition in this disclosure, the term "force" as used herein may refer not only to force, but to physical quantities indicative of force or analogous to force, such as, but not limited to, pressure and touch.

In this example, haptic actuator 107 comprises a Linear resonant actuator 107 which may be housed within enclosure 101, and may include any suitable system, device, or apparatus for producing an oscillating mechanical force across a single axis. It will be appreciated that in some examples there may be more than one haptic actuator which may be controlled together as a haptic output system. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce in oscillating mechanical force across multiple axes may be used in lieu of or in addition to linear resonant actuator 107. As described elsewhere in this disclosure, a linear resonant actuator 107, based on a signal received from integrated haptic system 112, may render haptic feedback to a user of mobile device 102 for at least one of mechanical button replacement and capacitive sensor feedback.

Integrated haptic system 112 may be housed within enclosure 101, may be communicatively coupled to force sensor system 105 and haptic actuator 107, and may include any system, device, or apparatus configured to receive a signal from force sensor system 105 indicative of a force applied to mobile device 102 (e.g., a force applied by a human finger to a virtual button of mobile device 102) and generate an electronic signal for driving linear resonant actuator 107 in response to the force applied to mobile device 102.

Although specific example components are depicted above as being integral to mobile device 102 (e.g., controller 103, memory 104, force sensor system 105, microphone 106, radio transmitter/receiver 108, speakers(s) 110), a mobile device 102 in accordance with this disclosure may comprise one or more components not specifically enumerated above. For example, although FIG. 1 depicts certain user interface components, mobile device 102 may include one or more other user interface components in addition to those depicted in the above figure, including but not limited to a keypad, a touch screen, and a display, thus allowing a user to interact with and/or otherwise manipulate mobile device 102 and its associated components.

Figure 2:
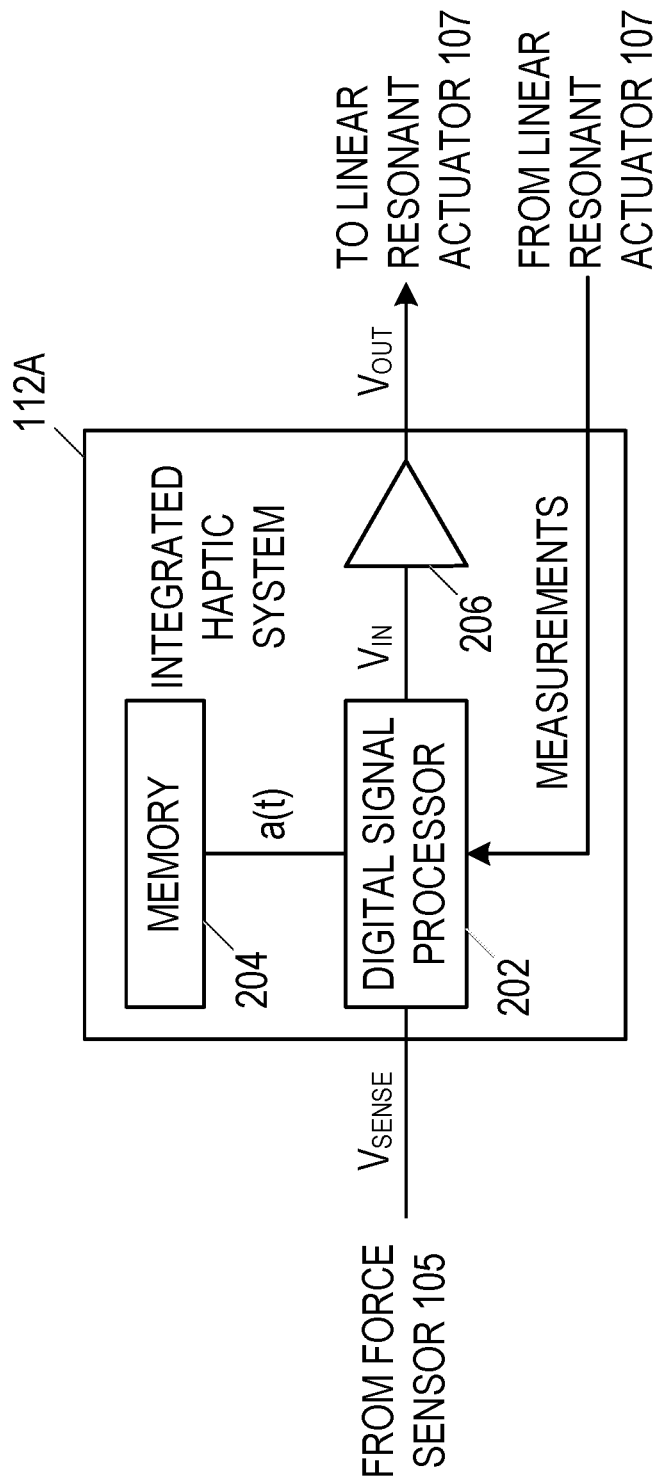
FIG. 2 illustrates a block diagram of selected components of an example integrated haptic system, in accordance with embodiments of the present disclosure.

FIG. 2 illustrates a block diagram of selected components of an example integrated haptic system 112A, in accordance with embodiments of the present disclosure. In some embodiments, integrated haptic system 112A may be used to implement the integrated haptic system 112 of FIG. 1. As shown in FIG. 2, integrated haptic system 112A may include a controller (which in this example comprises a digital signal processor (DSP)) 202, a memory 204, and an amplifier 206.

DSP 202 may include any system, device, or apparatus configured to interpret and/or execute program instructions and/or process data. In some embodiments, DSP 202 may interpret and/or execute program instructions and/or process data stored in memory 204 and/or other computer-readable media accessible to DSP 202. The DSP 202 operates as a controller for the integrated haptic system 112A.

Memory 204 may be communicatively coupled to DSP 202, and may include any system, device, or apparatus configured to retain program instructions and/or data for a period of time (e.g., computer-readable media). Memory 204 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Amplifier 206 may be electrically coupled to DSP 202 and may comprise any suitable electronic system, device, or apparatus configured to increase the power of an input signal VIN (e.g., a time-varying voltage or current) to generate an output signal VOUT. For example, amplifier 206 may use electric power from a power supply (not explicitly shown) to increase the amplitude of a signal. Amplifier 206 may include any suitable amplifier class, including without limitation, a Class-D amplifier.

In operation, memory 204 may store one or more haptic playback representations. A haptic playback representation may comprise a waveform. In some examples, a haptic playback representation may comprise one or more parameters, for example, frequency amplitude and duration, allowing for the determination of a haptic waveform based on the parameters. In some embodiments, each of the one or more haptic playback representations may define a haptic response a(t) as a desired acceleration of a linear resonant actuator (e.g., linear resonant actuator 107) as a function of time.

The controller or DSP 202 is configured to receive a force signal VSENSE from force sensor system 105 indicative of force applied to at least one force sensor of the force sensor system 105. Either in response to receipt of force signal VSENSE indicating a sensed force or independently of such receipt, DSP 202 may retrieve a haptic playback representation from memory 104 and may process the haptic playback representation to determine a processed haptic playback signal VIN. In embodiments in which amplifier 206 is a Class D amplifier, processed haptic playback signal VIN may comprise a pulse-width modulated signal. In response to receipt of force signal VSENSE indicating a sensed force, DSP 202 may cause processed haptic playback signal VIN to be output to amplifier 206, and amplifier 206 may amplify processed haptic playback signal VIN to generate a haptic output signal VOUT for driving linear resonant actuator 107.

In some embodiments, integrated haptic system 112A may be formed on a single integrated circuit, thus enabling lower latency than existing approaches to haptic feedback control. By providing integrated haptic system 112A as part of a single monolithic integrated circuit, latencies between various interfaces and system components of integrated haptic system 112A may be reduced or eliminated.

Figure 3:
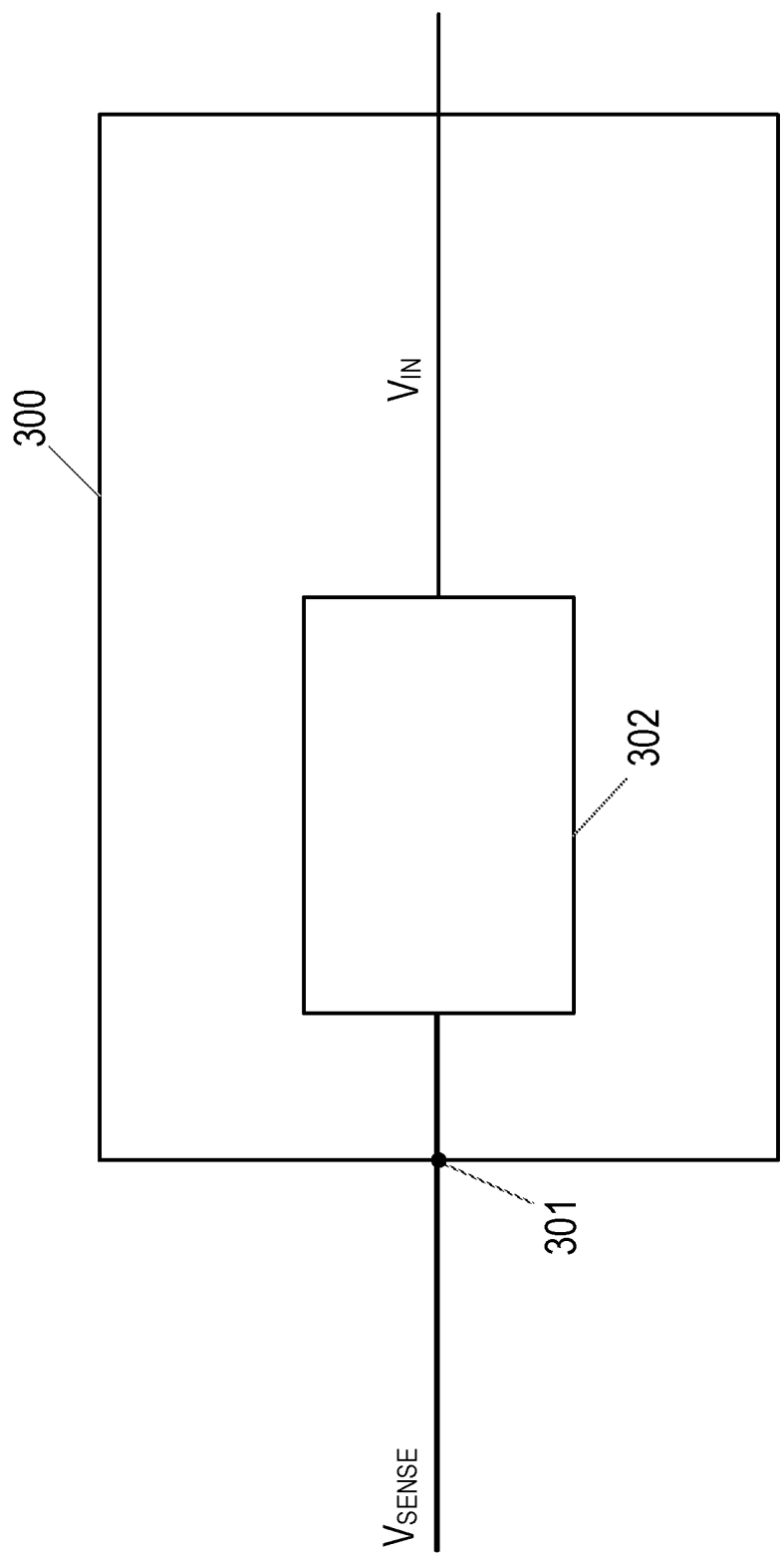
FIG. 3 illustrates a controller for providing a haptic output signal to a haptic actuator in accordance with embodiments of the present disclosure.

FIG. 3 illustrates a controller 300 for providing a haptic output signal to a haptic actuator in accordance with some embodiments of the disclosure. The controller 300 may be implemented by the controller 202 of FIG. 2.

The controller 300 comprises an input 301 configured to receive a force sensor signal $V_{SENSE}$ from at least one force sensor. For example, the controller 300 may be configured to receive the force sensor signal $V_{SENSE}$ from the force sensor system 105 of FIG. 1.

The controller 300 may also comprise a haptic output module 302 configured to generate a haptic output signal $V_{IN}$ for output to a haptic actuator. For example, the controller 300 may be configured to generate the haptic output signal $V_{IN}$ as described with reference to FIG. 2 for output to the amplifier 206. The amplifier 206 may then drive the haptic actuator 107 with the signal $V_{OUT}$ derived from the haptic output signal $V_{IN}$.

The haptic output module 302 may be configured to, responsive to determining that the force sensor signal $V_{SENSE}$ indicates that a force level applied to the at least one force sensor exceeds a first threshold, trigger output of the haptic output signal. For example, the amplitude of the force sensor signal $V_{SENSE}$ may be representative of a level of force that a user is applying to the at least one sensor signal. In these examples, the haptic output module 302 may be configured to monitor the received force sensor signal $V_{SENSE}$ and compare the amplitude of the force sensor signal $V_{SENSE}$ to a threshold, wherein the threshold is indicative of a user touch event, for example a level of force considered to represent a button press. Once the force sensor signal $V_{SENSE}$ exceeds the threshold, the controller 300 may determine that the user touch event has occurred, and may therefore commence the process to trigger output of the haptic output signal $V_{IN}$, for example to the amplifier 206, in order to generate a haptic feedback effect to be output by the haptic actuator 107. The haptic feedback effect may be designed to notify the user that they have caused the user touch event to occur.

For example, the haptic output module may be configured to retrieve stored haptic signal representations from a memory (for example, memory 204 as illustrated in FIG. 2). The stored haptic signal representations may comprise haptic waveforms (for example pulse width modulated (PWM) waveforms). In some examples, the stored haptic signal representations may comprise one or more parameters which may be used to construct a haptic output signal, for example frequency, amplitude and time.

In some examples therefore, the haptic output module 302 may be configured to trigger output of the haptic output signal $V_{IN}$ by, responsive to determining that the force sensor signal indicates that a force level applied to the at least one force sensor exceeds a first threshold, select a first stored haptic signal representation from a plurality of stored haptic signal representations based on the first threshold; and generate the haptic output signal based on the first stored haptic signal representation.

In other words, the first threshold may be representative of a first level of force being applied to the at least one force sensor. This first level of force may for example be associated with a "light push" user event. The first stored haptic signal representation may therefore be selected as a haptic signal representation which may be used to generate a haptic effect associated with a "light push" user event.

It will be appreciated that in some circumstances the amplitude of the received force sensor signal $V_{SENSE}$ may not be directly proportional to the level of force applied by the user. In these circumstances the force sensor signal $V_{SENSE}$ may be processed before being compared to the threshold, or the threshold may be designed such that it is reflective of the force sensor signal representative of the force level that defines the user touch event.

The haptic output module 302 may also be configured to, during output of the haptic output signal, adjust the haptic output signal based on the force sensor signal. For example, during the process of generating the haptic output signal $V_{IN}$, and as the haptic playback signal $V_{OUT}$ is being output by the amplifier 206, the controller 300 may be configured to continually monitor the received force sensor signal $V_{SENSE}$ received from the force sensor system 105. The controller 300 may be configured to dynamically adjust the haptic output signal $V_{IN}$ based on the continually-monitored received force sensor signal $V_{SENSE}$. For example, the controller 300 may be configured to change the haptic output signal $V_{IN}$ responsive to changes in the received force signal $V_{SENSE}$.

For example, the haptic output module 302 may be configured to adjust one or more of an amplitude, acceleration or duration of the haptic output signal based on the force sensor signal.

For example, the haptic output module may be configured to adjust the haptic output signal by selecting a second stored haptic signal representation, and adjusting the haptic output signal such that the haptic output signal is generated based on the second stored haptic signal representation. The second stored haptic signal representation may therefore produce a haptic output signal that has a different amplitude, acceleration and/or duration than the haptic output signal produced by the first stored haptic signal representation.

In general, the haptic output module 302 may be configured to adjust one or more of the amplitude, acceleration, or duration of the haptic output signal $V_{IN}$ based on the received force sensor signal $V_{SENSE}$, during driving of the haptic actuator 107 by the amplifier 206. For example, the haptic output module 202 may be configured to select a different haptic signal representation from the memory 104, based on changes in the received force signal $V_{SENSE}$.

For example, responsive to a change in an amplitude, rate of change and/or duration of the force sensor signal, the haptic output module 302 may be configured to adjust the haptic output signal $V_{IN}$. In some examples, the haptic output signal may be selected based on a current application or use context of the device. In other words, if the device comprises a smart phone, the haptic output signal may be different depending on whether the smart phone is in a gaming mode or being used to make a phone call. For example, more haptic feedback may be desirable in a gaming mode compared to when the device is being used to make a phone call. In some examples therefore, where the controller forms part of a device, and the controller may be configured to receive an indication of an application running on the device, and the haptic output module may be configured to adjust the haptic output signal based on the indication.

In some examples, the haptic output signal may be dynamically adjusted based on a combination of the factors listed above.

Figure 4:
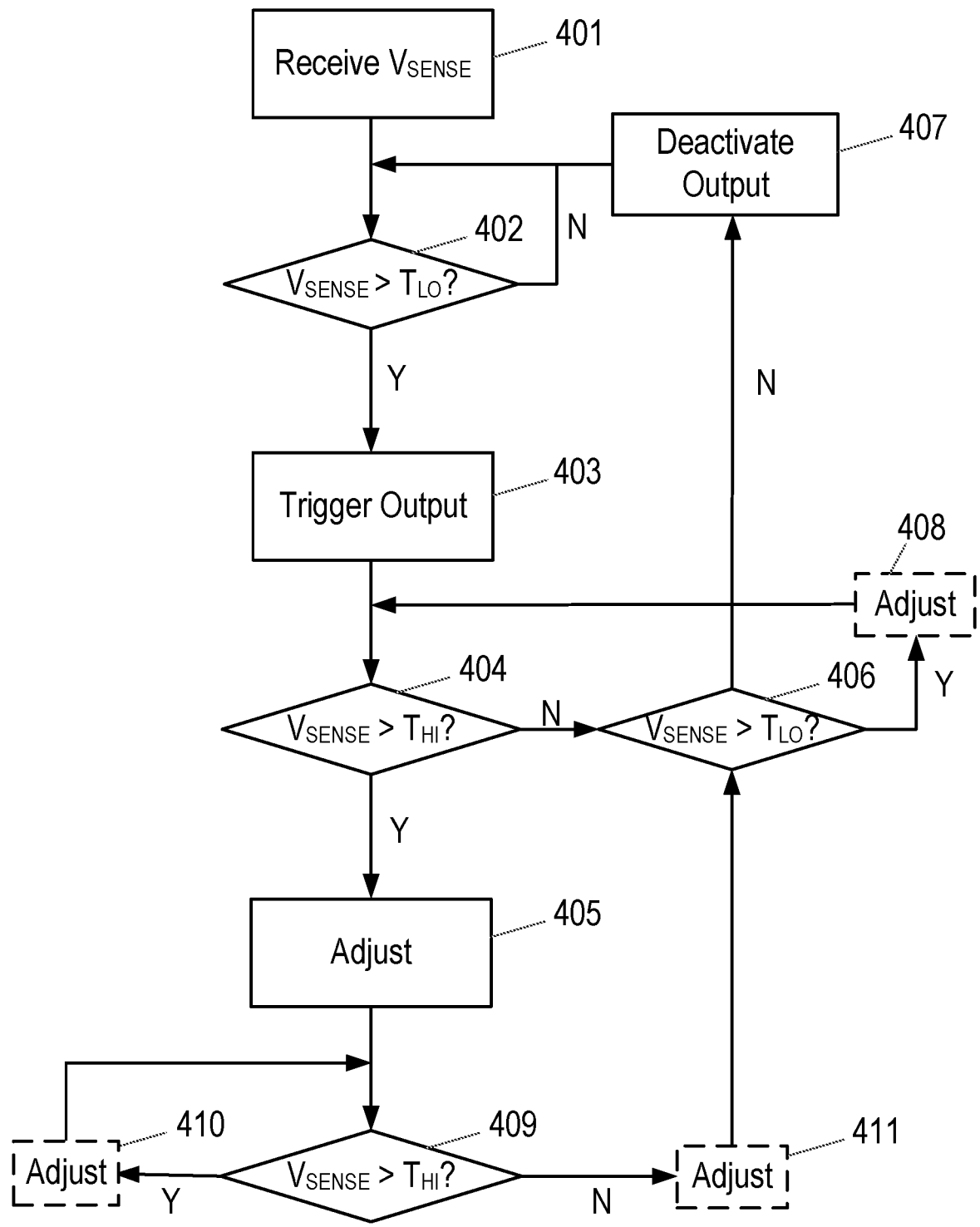
FIG. 4 illustrates an example of a method performed by a haptic output module for adjusting the haptic output signal, in accordance with embodiments of the present disclosure.

In some examples a plurality of threshold values may be compared to the force sensor signal (for example, the amplitude duration or rate of change of the force sensor signal) in order to determine when to adjust the haptic output signal. For example, the haptic output module may be configured to compare the force level that the force sensor signal indicates is being applied to the at least one force sensor to a plurality of threshold values, and may adjust the haptic output signal based on the comparison. FIG. 4 illustrates an example of a method in which two thresholds are utilized to adjust the haptic output signal.

FIG. 4 illustrates an example of a method performed by a haptic output module 302 for adjusting the haptic output signal $V_{IN}$.

In this example, the haptic output module 302 is configured to compare the signal level of the force sensor signal $V_{SENSE}$ against a plurality of threshold values.

In step 401, the haptic output module receives the force sensor signal $V_{SENSE}$ from the at least one force sensor.

In step 402, the haptic output module compares the amplitude of the force sensor signal to a first threshold, $T_{LO}$. It will be appreciated that a force sensor signal having an amplitude over the first threshold, $T_{LO}$, may be indicative of a force level being applied to the at least one force sensor that is above a threshold force level, for example, a threshold force level considered to be representative of user activation of the at least one force sensor.

If in step 402 the haptic output module 302 determines that the amplitude of the force sensor signal does not exceed the first threshold $T_{LO}$, then the method returns to step 402 and the force sensor signal $V_{SENSE}$ is continually monitored and compared against the first threshold $T_{LO}$. In other words, as the amplitude of the force sensor signal $V_{SENSE}$ has not exceed the first threshold value $T_{LO}$ the haptic output module is configured to judge that no user touch event has occurred (i.e. no push or press of a virtual button has occurred).

If in step 402 the haptic output module 302 determines that the amplitude of the force sensor signal exceeds the first threshold $T_{LO}$, then the method passes to step 403. In step 403 the haptic output module 302 may trigger output of the haptic output signal $V_{IN}$. For example, as described above, the haptic output module 302 may retrieve a stored haptic signal representation from a memory and may generate the haptic output signal $V_{in}$ based on the first haptic signal representation. Which haptic signal representation is selected as the first haptic signal representation may be based on a number of factors. For example, the selection of the first haptic signal representation may be based on the rate of change of the force sensor signal $V_{SENSE}$. In other words, the haptic output signal may be different depending on whether the user presses the at least one force sensor quickly or slowly.

The method may then comprise adjusting, during output of the haptic output signal, the haptic output signal based on the force sensor signal. In this example, the adjusting of the haptic output signal during output of the haptic output signal may comprise steps 404 to 411 of the method illustrated in FIG. 4.

After triggering the output of the haptic output signal $V_{IN}$ in step 403, the method passes to step 404 in which the haptic output module 302 continues to monitor the force sensor signal $V_{SENSE}$. In this example, the haptic output module 302 continues to monitor the force sensor signal $V_{SENSE}$ by comparing the force sensor signal to a second threshold, $T_{HI}$. The second threshold $T_{HI}$ may be higher than the first threshold $T_{LO}$.

If in step 404, the haptic output module 302 determines that the amplitude of the force sensor signal $V_{SENSE}$ is greater than the second threshold, $T_{HI}$ the method passes to step 405 in which the haptic output module adjusts the haptic output signal based on the amplitude of the force sensor signal now being greater than $T_{HI}$. For example, the haptic output module may be configured to adjust the haptic output signal responsive to the force sensor signal indicating that the force level applied to the at least one force sensor exceeds the first threshold and exceeds a second threshold higher than the first threshold.

For example, the haptic output module may judge that a user touch event of increased force has occurred (i.e. a strong push) as the amplitude of $V_{SENSE}$ is now greater than $T_{HI}$, and as a result the haptic output module may be configured to dynamically adjust the haptic output signal $V_{IN}$ to increase the amplitude or magnitude of the haptic vibrational output $V_{OUT}$ to be generated by the amplifier 206. As previously, the adjustment may be performed by selecting a new haptic signal representation from memory.

If in step 404, the haptic output module 302 determines that the amplitude of the force sensor signal $V_{SENSE}$ is not greater than the second threshold, $T_{HI}$ the method passes to step 406 in which the haptic output module 302 checks that the amplitude of the force sensor signal is still greater than the first threshold $T_{LO}$. If the amplitude of the force sensor signal has dropped below $T_{LO}$, the method may pass to step 407 in which the haptic output module may be configured to deactivate the haptic output signal. For example, as the amplitude of the force sensor signal has dropped back below the $T_{LO}$ threshold, the haptic output module may be configured to determine that the force being applied to the at least one force sensor is no longer high enough to be considered a user touch event, and therefore the haptic output signal may be turned off. The method may then return to step 402.

In some examples, to avoid ping-ponging between the haptic output signal being on and off, the threshold used in step 406 may be slightly lower than the threshold used in step 402. In other words, some hysteresis may be used.

If in step 406, the haptic output module 302 determines that the amplitude of the force sensor signal $V_{SENSE}$ is still greater than the first threshold $T_{LO}$, the method may pass to step 408 in which the haptic output module may adjust the haptic output signal. For example, step 408 may comprise adjusting the haptic output signal based on, for example, how long the amplitude of the force sensor signal has remained above the first threshold $T_{LO}$ (e.g. whether the user event a short press or a hold of the virtual button). For example, the haptic output module may be configured to adjust the haptic output signal to provide different feedback to the user based on whether the user event is categorized as a quick press of the virtual button or a press and hold of the virtual button. The method may then return to step 404 in which the haptic output module continues to monitor whether the amplitude force sensor signal $V_{SENSE}$ is greater than the second threshold $T_{HI}$. In some examples, the haptic output module may be configured to adjust the haptic output signal based on a length of time between the force sensor signal indicating that the force level exceeds the first threshold and the force sensor signal indicating that the force level exceeds the second threshold.

After step 405, the method may pass to step 409 in which the haptic output module continues to monitor whether the amplitude of the force sensor signal $V_{SENSE}$ remains above the second threshold $T_{HI}$. If the force sensor signal $V_{SENSE}$ is still greater than the second threshold $T_{HI}$, the haptic output module may adjust the haptic output signal in step 410. For example, step 410 may, similarly, to step 408, comprise adjusting the haptic output signal based on, for example, how long the amplitude of the force sensor signal has remained above the second threshold $T_{HI}$.

If in step 409, the force sensor signal drops below the second threshold $T_{HI}$, the haptic output module may be configured to adjust, in step 411, the haptic output signal based on the force being applied to the force sensor signal no longer being high enough to be considered a user touch event of increased force has occurred (i.e. a strong push). The method may then return to step 406 in which the haptic output module monitors whether the force sensor signal is greater than the first threshold $T_{LO}$.

Similarly to as in step 406, in order to avoid ping-ponging between the adjustment of step 405 and the adjustment of step 411, the second threshold $T_{HI}$ used in step 409 may be slightly lower than the second threshold $T_{HI}$ used in step 404.

It will be appreciated that FIG. 4 is an example illustration of how multiple thresholds may be used to dynamically adjust a haptic output signal. In practice, there may be many different button press interactions that may result in different haptic output signals. For example, the following are examples of different button press interactions, based on variations in the level of user force applied to a device, which may give rise to different haptic feedback responses:

Press button fully (strong push), release halfway (light push), short hold (push duration) and then release fully;

Press button fully (strong push), release halfway (light push), long hold (push duration) and then release fully;

Press button fully (strong push), release halfway (light push), press fully again (strong push); or Press button halfway (light push), hold (push duration), press fully (strong push).

In a further aspect, it will be understood that the thresholds used for dynamic adjustment of the haptic output signal may be different based on whether the force sensor signal is determined to represent a button press or a button release, as the system may generate different haptic feedback for button press or a button release. Additionally or alternatively, the haptic output signal or amplitude of the haptic output signal may be adjusted differently depending on whether the force sensor signal is representative of a button press or a button release. For example, the haptic output module may be configured to: determine a user action based on the force sensor signal, and adjust the haptic output signal based on the user action. The user action may comprise one or more of: a button press, a button release and a button hold.

It will be understood that the above-described methods may be implemented in a dedicated control module, for example a processing module or DSP as shown in the above figures. The control module may be provided as an integral part of the sensor system or may be provided as part of a centralized controller such as a central processing unit (CPU) or applications processor (AP). It will be understood that the control module may be provided with a suitable memory storage module for storing measured and calculated data for use in the described processes.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term "module" or the term "block" shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone. There is further provided a host device incorporating the above-described system.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Aspects of the system may be defined by the following numbered statements:

1. A control method for a combined force sensor and haptic system, the method comprising the steps of:
 a. Monitoring a force sense input;
 b. If the monitored force sense input exceeds a defined threshold level, triggering the driving of a haptic vibrational output;

c. During driving of the haptic vibrational output, continually monitoring the force sense input; and
d. Dynamically altering the haptic vibrational output based on the continually-monitored force sense input.
2. A combined force sensor and haptic system comprising:
a force sense module, to provide a force sense input based on input signals from at least one force sensor;
a haptic module, preferably a haptic amplifier, to generate a haptic drive signal to drive a haptic actuator such as a linear resonant actuator (LRA); and
a controller or digital signal processor (DSP) arranged to:
 (i) monitor the force sense input, and
 (ii) control the haptic module to generate a haptic drive signal if the force sense input exceeds a trigger threshold;
wherein the controller is further configured to:
 (iii) continually monitor the force sense input after the force sense input exceeds the trigger threshold; and
 (iv) dynamically adjust the haptic drive signal based on the continually-monitored force sense input.
3. Preferably, the system comprises memory storage, wherein the controller retrieves haptic output waveforms from a memory storage to provide the haptic drive signal, wherein the haptic drive signal based on the retrieved haptic output waveforms is adjusted based on the continually-monitored force sense input.
4. In one aspect, the controller is configured to select a first haptic output waveform from a plurality of stored haptic output waveforms if the force sense input exceeds a trigger threshold, wherein the controller is configured to select a different haptic output waveform from the plurality of stored haptic output waveforms based on changes in the continually-monitored force sense input.
5. Additionally or alternatively, the haptic module is arranged to dynamically generate haptic waveforms to provide the haptic drive signal, wherein the haptic drive signal is adjusted based on the continually-monitored force sense input.
6. Preferably, the controller is configured to adjust at least one of the amplitude, acceleration, and/or duration of the haptic drive signal, based on the continually-monitored force sense input.
7. Preferably, the controller is configured to adjust the haptic drive signal based on at least one of the amplitude, acceleration, and/or duration of the continually-monitored force sense input.
8. Preferably, the controller is configured to compare the continually-monitored force sense input against a plurality of defined thresholds, wherein the controller is configured to adjust the haptic drive signal based on the comparison.
9. In one aspect, the controller is arranged to receive data relating to the use case or context of operation of the system, wherein the controller is configured to adjust the haptic drive signal based at least in part on the received data.
10. In a further aspect, the controller is arranged to determine if the force sense input is indicative of user action signifying a button press or a button release, and wherein the controller is configured to adjust the haptic drive signal based at least in part on the determined user action.
11. There is also provided a host device comprising a force sensor/haptic system as described above, and at least one force sensor coupled with the force sensor/haptic system.
12. Preferably, the at least one force sensor comprises one or more of the following:
a capacitive displacement sensor,
an inductive force sensor,
a strain gauge,
a piezoelectric force sensor,
a force sensing resistor,
a piezoresistive force sensor,
a thin film force sensor, and/or
a quantum tunnelling composite-based force sensor.

The invention claimed is:

1. A controller for providing a haptic output signal to a haptic actuator, the controller comprising:
an input configured to receive a force sensor signal from at least one force sensor; and
a haptic output module configured to generate a haptic output signal for output to a haptic actuator; wherein the haptic output module is configured to:
 responsive to determining that the force sensor signal indicates that a force level applied to the at least one force sensor exceeds a first threshold, trigger output of the haptic output signal;
 during output of the haptic output signal, adjust the haptic output signal based on the force sensor signal;
 compare the force level that the force sensor signal indicates is being applied to the at least one force sensor to a plurality of threshold values;
 adjust the haptic output signal based on the comparison;
 adjust the haptic output signal responsive to the force sensor signal indicating that the force level applied to the at least one force sensor exceeds the first threshold and exceeds a second threshold higher than the first threshold; and
 adjust the haptic output signal based on a length of time between the force sensor signal indicating that the force level exceeds the first threshold and the force sensor signal indicating that the force level exceeds the second threshold.

2. The controller of claim 1 wherein the haptic output module is configured to:
responsive to determining that the force sensor signal indicates that the force level applied to the at least one force sensor exceeds the first threshold, select a first stored haptic signal representation from a plurality of stored haptic signal representations based on the first threshold; and
generate the haptic output signal based on the first stored haptic signal representation.

3. The controller of claim 2 wherein the haptic output module is configured to adjust the haptic output signal by:
selecting a second stored haptic signal representation, and
adjusting the haptic output signal such that the haptic output signal is generated based on the second stored haptic signal representation.

4. The controller of claim 1 wherein, the haptic output module is configured to adjust one or more of an amplitude, acceleration or duration of the haptic output signal based on the force sensor signal.

5. The controller of claim 1 wherein the haptic output module is configured to adjust the haptic output signal based on at least one of an amplitude, rate of change and/or duration of the force sensor signal.

6. The controller of claim 1 wherein the controller forms part of a device, and wherein the controller is configured to receive an indication of an application running on the device, and wherein the haptic output module is configured to adjust the haptic output signal based on the indication.

7. The controller of claim 1 wherein the haptic output module is configured to:

determine a user action based on the force sensor signal, and adjust the haptic output signal based on the user action.

8. The controller of claim 7 wherein the user action comprises one or more of: a button press, a button release and a button hold.

9. The controller of claim 1 wherein the haptic output signal comprises a pulse-width modulated signal.

10. A method for providing a haptic output signal to a haptic actuator, the method comprising:

receiving a force sensor signal from at least one force sensor;

responsive to determining that the force sensor signal indicates that a force level applied to the at least one force sensor exceeds a first threshold, triggering output of a haptic output signal;

during output of the haptic output signal, adjusting the haptic output signal based on the force sensor signal;

comparing the force level that the force sensor signal indicates is being applied to the at least one force sensor to a plurality of threshold values;

adjusting the haptic output signal based on the comparison;

adjusting the haptic output signal based on the comparison comprises adjusting the haptic output signal responsive to the force sensor signal indicating that the force level applied to the at least one force sensor exceeds the first threshold and exceeds a second threshold higher than the first threshold; and adjusting the haptic output signal based on the comparison comprises adjusting the haptic output signal based on a length of time between the force sensor signal indicating that the force level exceeds the first threshold and the force sensor signal indicating that the force level exceeds the second threshold.

11. The method of claim 10 further comprising:

responsive to determining that the force sensor signal indicates that the force level applied to the at least one force sensor exceeds the first threshold, selecting a first stored haptic signal representation from a plurality of stored haptic signal representations based on the first threshold; and generating the haptic output signal based on the first stored haptic signal representation.

12. The method of claim 11 wherein the step of adjusting the haptic output signal comprises:

selecting a second stored haptic signal representation, and adjusting the haptic output signal such that the haptic output signal is generated based on the second stored haptic signal representation.

13. The method of claim 10 wherein, the step of adjusting comprises adjusting one or more of an amplitude, acceleration or duration of the haptic output signal based on the force sensor signal.

14. The method of claim 10 wherein step of adjusting comprises adjusting the haptic output signal based on at least one of an amplitude, rate of change and/or duration of the force sensor signal.

15. The method of claim 10 further comprising receiving an indication of an application running on a device, and adjusting the haptic output signal based on the indication.

16. The method of claim 10 further comprising:

determining a user action based on the force sensor signal, and adjusting the haptic output signal based on the user action.

17. The method of claim 16 wherein the user action comprises one or more of: a button press, a button release and a button hold.

18. The method of claim 10 wherein the haptic output signal comprises a pulse-width modulated signal.

19. An integrated circuit comprising a controller for providing a haptic output signal to a haptic transducer, the controller comprising:

an input configured to receive a force sensor signal from at least one force sensor;

a haptic output module configured to generate a haptic output signal for output to a haptic actuator; wherein the haptic output module is configured to:

responsive to determining that the force sensor signal indicates that a force level applied to the at least one force sensor exceeds a first threshold, trigger output of the haptic output signal;

during output of the haptic output signal, adjust the haptic output signal based on the force sensor signal;

compare the force level that the force sensor signal indicates is being applied to the at least one force sensor to a plurality of threshold values;

adjust the haptic output signal based on the comparison;

adjust the haptic output signal responsive to the force sensor signal indicating that the force level applied to the at least one force sensor exceeds the first threshold and exceeds a second threshold higher than the first threshold; and adjust the haptic output signal based on a length of time between the force sensor signal indicating that the force level exceeds the first threshold and the force sensor signal indicating that the force level exceeds the second threshold.

20. A device comprising:

at least one force sensor;

a haptic transducer; and a controller for providing a haptic output signal to a haptic transducer the controller comprising:

an input configured to receive a force sensor signal from the at least one force sensor, a haptic output module configured to generate a haptic output signal for output to the haptic transducer; wherein the haptic output module is configured to:

responsive to determining that the force sensor signal indicates that a force level applied to the at least one force sensor exceeds a first threshold, trigger output of the haptic output signal;

during output of the haptic output signal, adjust the haptic output signal based on the force sensor signal;

compare the force level that the force sensor signal indicates is being applied to the at least one force sensor to a plurality of threshold values;

adjust the haptic output signal based on the comparison;

adjust the haptic output signal responsive to the force sensor signal indicating that the force level applied to the at least one force sensor exceeds the first threshold and exceeds a second threshold higher than the first threshold; and adjust the haptic output signal based on a length of time between the force sensor signal indicating that the force level exceeds the first threshold and the force sensor signal indicating that the force level exceeds the second threshold.

21. The device of claim 20 wherein the at least one force sensor comprises one or more of:
a capacitive displacement sensor, an inductive force sensor, a strain gauge, a piezoelectric force sensor, a force sensing resistor, a piezoresistive force sensor, a thin film force sensor, and/or a quantum tunneling composite based force sensor.

22. The device of claim 20 wherein the haptic transducer comprises a Linear Resonant Actuator, LRA.

* * * * *

UNITED STATES PATENT AND TRADEMARK OFFICE
CERTIFICATE OF CORRECTION

PATENT NO. : 11,150,733 B2
APPLICATION NO. : 16/661323
DATED : October 19, 2021
INVENTOR(S) : Das et al.

It is certified that error appears in the above-identified patent and that said Letters Patent is hereby corrected as shown below:

In the Claims

1. In Column 14, Lines 13-14, in Claim 1, delete "a haptic output signal" and insert -- the haptic output signal --, therefor.

2. In Column 14, Line 53, in Claim 4, delete "wherein," and insert -- wherein --, therefor.

3. In Column 15, Line 16, in Claim 10, delete "a haptic output signal;" and insert -- the haptic output signal; --, therefor.

4. In Column 15, Line 53, in Claim 13, delete "wherein," and insert -- wherein --, therefor.

5. In Column 16, Lines 11-12, in Claim 19, delete "a haptic output signal" and insert -- the haptic output signal --, therefor.

6. In Column 16, Lines 43-44, in Claim 20, delete "a haptic output signal" and insert -- the haptic output signal --, therefor.

Signed and Sealed this
Twenty-second Day of August, 2023

Katherine Kelly Vidal
*Director of the United States Patent and Trademark Office*